US008376829B2

(12) United States Patent
Nores

(10) Patent No.: US 8,376,829 B2
(45) **Date of Patent: *Feb. 19, 2013**

(54) SLOT MACHINE GAME WITH RESPIN FEATURE WHICH IDENTIFIES POTENTIAL WINS

(75) Inventor: Alvaro Nores, Buenos Aires (AR)

(73) Assignee: Etasse Limited, Alderney (GB)

( * ) Notice: Subject to any disclaimer, the term of this patent is extended or adjusted under 35 U.S.C. 154(b) by 710 days.

This patent is subject to a terminal disclaimer.

(21) Appl. No.: 12/107,255

(22) Filed: Apr. 22, 2008

(65) Prior Publication Data

US 2008/0318660 A1 Dec. 25, 2008

Related U.S. Application Data

(63) Continuation-in-part of application No. 11/337,960, filed on Jan. 23, 2006, now abandoned.

(51) Int. Cl.
*A63F 9/24* (2006.01)
*A63F 13/00* (2006.01)

(52) U.S. Cl. ................................ 463/20; 463/16; 463/25

(58) Field of Classification Search .............. 463/16–21, 463/25, 29; 273/269, 138.1, 139

See application file for complete search history.

(56) References Cited

U.S. PATENT DOCUMENTS

| | | | | | |
|---|---|---|---|---|---|
| 4,836,546 | A | * | 6/1989 | DiRe et al. | 463/18 |
| 5,033,744 | A | * | 7/1991 | Bridgeman et al. | 463/13 |
| 5,342,049 | A | * | 8/1994 | Wichinsky et al. | 273/119 R |
| 5,401,023 | A | * | 3/1995 | Wood | 463/13 |
| 5,401,024 | A | | 3/1995 | Simunek | |
| 5,411,271 | A | | 5/1995 | Mirando | |
| 5,456,465 | A | | 10/1995 | Durham | |
| 5,511,781 | A | * | 4/1996 | Wood et al. | 463/13 |
| 5,704,835 | A | * | 1/1998 | Dietz, II | 463/20 |
| 5,720,662 | A | * | 2/1998 | Holmes et al. | 463/20 |
| 5,769,716 | A | * | 6/1998 | Saffari et al. | 463/20 |
| 5,823,874 | A | | 10/1998 | Adams | |
| 5,833,537 | A | | 11/1998 | Barrie | |
| 5,947,821 | A | | 9/1999 | Stone | |
| 5,976,016 | A | | 11/1999 | Moody et al. | |
| 6,001,016 | A | | 12/1999 | Walker et al. | |
| 6,015,346 | A | | 1/2000 | Bennett | |
| 6,070,874 | A | | 6/2000 | Ivers | |
| 6,120,298 | A | | 9/2000 | Jenkins et al. | |

(Continued)

FOREIGN PATENT DOCUMENTS

| | | |
|---|---|---|
| EP | 1063622 | 12/2000 |
| EP | 1652562 | 5/2006 |

(Continued)

OTHER PUBLICATIONS

European Patent Office, Supplementary European Search Report for European Application No. EP 06 71 8145, report completed Apr. 30, 2010.

(Continued)

*Primary Examiner* — Milap Shah
(74) *Attorney, Agent, or Firm* — McDonnell Boehnen Hulbert & Berghoff LLP

(57) ABSTRACT

A slot machine game that allows the player to respin a selected reel. Before the selected reel is respun, the game displays to the player which paylines can potentially win awards, as well as what particular combinations are available to the player to win. In this manner, a player may be encouraged to make a respin. The player will also find this information helpful in determining whether to purchase a respin.

18 Claims, 15 Drawing Sheets

U.S. PATENT DOCUMENTS 6,129,632 A * 10/2000 Luciano .......................... 463/12
6,159,097 A 12/2000 Gura
6,174,235 B1 * 1/2001 Walker et al. .................. 463/25
6,186,894 B1 2/2001 Mayeroff
6,193,606 B1 2/2001 Walker et al.
6,210,275 B1 4/2001 Olsen
6,224,483 B1 5/2001 Mayeroff
6,270,409 B1 * 8/2001 Shuster .......................... 463/20
6,287,197 B1 9/2001 Dickinson et al.
6,338,678 B1 1/2002 Seelig et al.
6,346,043 B1 2/2002 Colin et al.
6,347,996 B1 2/2002 Gilmore et al.
6,358,147 B1 3/2002 Jaffe et al.
6,390,473 B1 5/2002 Vancura et al.
6,394,899 B1 5/2002 Walker
6,413,161 B1 7/2002 Baerlocher et al.
6,425,824 B1 7/2002 Baerlocher et al.
6,450,888 B1 9/2002 Takase et al.
6,485,367 B1 * 11/2002 Joshi .............................. 463/13
6,547,242 B1 4/2003 Sugiyama et al.
6,554,283 B2 4/2003 Vancura et al.
6,575,831 B1 * 6/2003 Gonen et al. ................... 463/25
6,595,854 B2 7/2003 Hughs-Baird et al.
6,601,850 B1 8/2003 Ross
6,604,740 B1 * 8/2003 Singer et al. .................. 273/292
6,609,974 B2 8/2003 Mead et al.
6,641,477 B1 11/2003 Dietz et al.
6,663,489 B2 12/2003 Baerlocher et al.
6,666,765 B2 * 12/2003 Vancura ........................... 463/9
6,669,559 B1 12/2003 Baerlocher et al.
6,695,696 B1 * 2/2004 Kaminkow ..................... 463/16
6,709,332 B2 3/2004 Adams
6,731,313 B1 5/2004 Kaminkow
6,752,396 B2 6/2004 Smith
6,769,986 B2 8/2004 Vancura
6,780,107 B2 8/2004 Baerlocher et al.
6,811,486 B1 * 11/2004 Luciano, Jr. .................... 463/24
6,830,514 B2 12/2004 Meyer et al.
6,855,054 B2 * 2/2005 White et al. .................... 463/21
6,860,810 B2 3/2005 Cannon et al.
6,863,606 B1 3/2005 Berg et al.
6,869,360 B2 3/2005 Marks et al.
6,884,165 B2 4/2005 Baerlocher
6,890,257 B2 * 5/2005 Baerlocher ..................... 463/25
6,896,260 B2 5/2005 Pierce
6,902,481 B2 6/2005 Breckner et al.
6,938,068 B1 8/2005 Kraft et al.
6,939,223 B1 * 9/2005 Jones ............................. 463/16
6,942,568 B2 9/2005 Baerlocher
6,942,571 B1 9/2005 McAllister et al.
6,950,993 B2 9/2005 Breinberg
6,964,416 B2 11/2005 McClintic et al.
6,966,836 B1 11/2005 Rush et al.
6,984,174 B2 1/2006 Cannon et al.
6,991,539 B2 1/2006 Pacey
6,997,805 B2 2/2006 Vancura
7,036,083 B1 4/2006 Zenith
7,066,811 B1 * 6/2006 DeFrees-Parrott et al. ...... 463/19
7,147,559 B2 12/2006 Englman
7,175,527 B2 2/2007 Bryant
7,192,346 B2 * 3/2007 Mathis ............................ 463/20
7,252,589 B1 * 8/2007 Marks et al. .................... 463/16
7,264,545 B2 9/2007 Maya et al.
7,275,989 B2 * 10/2007 Moody ........................... 463/20
7,326,115 B2 2/2008 Baerlocher
7,341,513 B2 3/2008 Cuddy et al.
7,364,506 B2 4/2008 Jaffe et al.
7,367,883 B2 5/2008 Gagnon
7,371,173 B2 5/2008 Gatto et al.
7,377,850 B2 5/2008 Shackelford et al.
7,393,278 B2 * 7/2008 Gerson et al. .................. 463/20
7,470,193 B2 12/2008 Umezaki
7,534,168 B2 5/2009 Bennett et al.
7,559,836 B2 7/2009 Gerson et al.
7,585,219 B2 9/2009 Randall et al.
7,631,872 B2 12/2009 Roemer et al.
7,690,996 B2 4/2010 Iddings et al.
7,713,123 B2 5/2010 Gerson et al.
7,727,063 B2 * 6/2010 Walker et al. ................... 463/17
7,753,790 B2 7/2010 Nguyen et al.
7,819,748 B2 10/2010 Ajioka
2001/0003709 A1 6/2001 Adams
2001/0009865 A1 7/2001 Demar et al.
2001/0031659 A1 10/2001 Perrie et al.
2002/0010017 A1 * 1/2002 Bennett ........................... 463/20
2002/0027323 A1 3/2002 Vancura et al.
2002/0043759 A1 4/2002 Vancura
2002/0045474 A1 4/2002 Singer et al.
2002/0049082 A1 4/2002 Bansemer et al.
2002/0052234 A1 5/2002 Adams
2002/0058545 A1 5/2002 Luciano
2002/0077165 A1 6/2002 Bansemer et al.
2003/0003980 A1 1/2003 Moody
2003/0013514 A1 1/2003 Cregan et al.
2003/0022711 A1 1/2003 Locke et al.
2003/0027619 A1 2/2003 Nicastro
2003/0027639 A1 2/2003 Peterson et al.
2003/0060276 A1 * 3/2003 Walker et al. ................... 463/25
2003/0060278 A1 3/2003 Walker et al.
2003/0060281 A1 3/2003 Vancura
2003/0064782 A1 * 4/2003 Beaulieu et al. ................ 463/20
2003/0064797 A1 4/2003 Jackson et al.
2003/0064800 A1 * 4/2003 Jackson et al. .................. 463/30
2003/0092476 A1 * 5/2003 Fox ................................ 463/13
2003/0092480 A1 * 5/2003 White et al. .................... 463/20
2003/0100361 A1 5/2003 Sharpless et al.
2003/0119576 A1 6/2003 McClintic et al.
2003/0119581 A1 6/2003 Cannon et al.
2003/0125107 A1 7/2003 Cannon
2003/0130027 A1 7/2003 Aida
2003/0153375 A1 8/2003 Vancura
2003/0162584 A1 8/2003 Hughs-Baird et al.
2003/0181231 A1 9/2003 Vancura et al.
2003/0186733 A1 10/2003 Wolf et al.
2003/0195027 A1 10/2003 Baerlocher et al.
2003/0195034 A1 10/2003 Dunaevsky
2003/0224849 A1 12/2003 Geiger
2004/0014517 A1 1/2004 Inoue
2004/0023715 A1 2/2004 Luciano, Jr.
2004/0036216 A1 2/2004 Vancura
2004/0048650 A1 3/2004 Mierau et al.
2004/0053657 A1 * 3/2004 Fiden et al. ..................... 463/16
2004/0053683 A1 3/2004 Hartl et al.
2004/0063483 A1 * 4/2004 Wolf et al. ...................... 463/13
2004/0072603 A1 * 4/2004 Shuster .......................... 463/16
2004/0092300 A1 5/2004 Gauselmann
2004/0116173 A1 6/2004 Baerlocher
2004/0121838 A1 6/2004 Hughs-Baird et al.
2004/0127280 A1 * 7/2004 Moody ........................... 463/20
2004/0152509 A1 8/2004 Hornik et al.
2004/0176157 A1 9/2004 Walker et al.
2004/0198490 A1 10/2004 Bansemer et al.
2004/0204233 A1 10/2004 Saffari et al.
2004/0209662 A1 10/2004 Wadleigh
2004/0219969 A1 11/2004 Casey et al.
2004/0235548 A1 11/2004 Benbrahim
2004/0235556 A1 11/2004 Flemming et al.
2004/0242316 A1 12/2004 Oles et al.
2005/0014551 A1 1/2005 Packes et al.
2005/0014557 A1 * 1/2005 Duhamel ........................ 463/20
2005/0014563 A1 1/2005 Barri
2005/0026664 A1 2/2005 Bansemer et al.
2005/0026679 A1 2/2005 Lucchesi et al.
2005/0032566 A1 2/2005 Baerlocher et al.
2005/0033711 A1 2/2005 Horvitz et al.
2005/0054416 A1 3/2005 Hostetler et al.
2005/0054430 A1 3/2005 Pitman et al.
2005/0085285 A1 4/2005 Muskin
2005/0090307 A1 4/2005 Walker et al.
2005/0107154 A1 5/2005 Pacey
2005/0119040 A1 6/2005 Berman et al.
2005/0130737 A1 6/2005 Englman et al.
2005/0137007 A1 6/2005 Schaufelberger
2005/0153765 A1 7/2005 Shoostine
2005/0153770 A1 7/2005 Vancura
2005/0164794 A1 7/2005 Tahara
2005/0176494 A1 8/2005 Thomas

| | | | | |
|---|---|---|---|---|
| 2005/0181866 | A1 | 8/2005 | Baerlocher | |
| 2005/0187005 | A1 | 8/2005 | Rose | |
| 2005/0202864 | A1 | 9/2005 | Duhamel et al. | |
| 2005/0202869 | A1 | 9/2005 | Miyamoto et al. | |
| 2005/0215311 | A1 | 9/2005 | Hornik et al. | |
| 2005/0266916 | A1 | 12/2005 | Sato et al. | |
| 2005/0277469 | A1 | 12/2005 | Pryzby et al. | |
| 2006/0003831 | A1 | 1/2006 | Falciglia | |
| 2006/0019738 | A1 | 1/2006 | Baerlocher et al. | |
| 2006/0030398 | A1 | 2/2006 | Hornik | |
| 2006/0046818 | A1 | 3/2006 | Goins | |
| 2006/0046853 | A1 | 3/2006 | Black | |
| 2006/0073863 | A1 | 4/2006 | Hagiwara | |
| 2006/0073878 | A1 | 4/2006 | Shackelford et al. | |
| 2006/0121972 | A1 | 6/2006 | Walker et al. | |
| 2006/0121978 | A1 | 6/2006 | Hornik et al. | |
| 2006/0160595 | A1 | 7/2006 | Gerson et al. | |
| 2006/0160614 | A1 | 7/2006 | Walker et al. | |
| 2006/0172791 | A1 | 8/2006 | Wolf | |
| 2006/0181028 | A1 | 8/2006 | Benator | |
| 2006/0183536 | A1 | 8/2006 | Gagner et al. | |
| 2006/0189377 | A1* | 8/2006 | Gomez et al. | 463/20 |
| 2006/0189378 | A1 | 8/2006 | Aoki | |
| 2006/0205483 | A1 | 9/2006 | Meyer et al. | |
| 2006/0240890 | A1 | 10/2006 | Walker et al. | |
| 2006/0247035 | A1 | 11/2006 | Rowe et al. | |
| 2006/0252494 | A1 | 11/2006 | Gerson et al. | |
| 2006/0252495 | A1 | 11/2006 | Gerson et al. | |
| 2006/0264255 | A1* | 11/2006 | Borissov | 463/20 |
| 2007/0060254 | A1 | 3/2007 | Muir | |
| 2007/0060314 | A1 | 3/2007 | Baerlocher et al. | |
| 2007/0077988 | A1 | 4/2007 | Friedman | |
| 2007/0087805 | A1 | 4/2007 | Taylor | |
| 2007/0102877 | A1 | 5/2007 | Personius et al. | |
| 2007/0161424 | A1 | 7/2007 | Gatto et al. | |
| 2007/0167217 | A1 | 7/2007 | Kaminkow et al. | |
| 2007/0281774 | A1 | 12/2007 | Khal | |
| 2007/0287523 | A1 | 12/2007 | Esses et al. | |
| 2008/0045295 | A1 | 2/2008 | Walker et al. | |
| 2008/0076513 | A1 | 3/2008 | Esses et al. | |
| 2008/0076518 | A1 | 3/2008 | Yoshizawa | |
| 2008/0102923 | A1 | 5/2008 | Esses et al. | |
| 2008/0113769 | A1 | 5/2008 | Montero et al. | |
| 2008/0119260 | A1 | 5/2008 | Nores | |
| 2008/0119261 | A1 | 5/2008 | Heymann | |
| 2008/0153570 | A1 | 6/2008 | Esses et al. | |
| 2008/0167116 | A1 | 7/2008 | Gerson | |
| 2008/0214292 | A1 | 9/2008 | Bryant et al. | |
| 2008/0234032 | A1 | 9/2008 | Brunet de Courssou et al. | |
| 2008/0274798 | A1 | 11/2008 | Walker et al. | |
| 2008/0310302 | A1 | 12/2008 | Detwiler et al. | |
| 2008/0318660 | A1 | 12/2008 | Nores | |
| 2009/0005145 | A1 | 1/2009 | White | |
| 2009/0029773 | A1 | 1/2009 | Cherry | |
| 2009/0029779 | A1 | 1/2009 | Murase et al. | |
| 2009/0061982 | A1 | 3/2009 | Brito | |
| 2009/0064000 | A1 | 3/2009 | Garbow et al. | |
| 2009/0093296 | A1 | 4/2009 | Gerson et al. | |
| 2009/0104977 | A1 | 4/2009 | Zielinski | |
| 2009/0124328 | A1 | 5/2009 | Nores | |
| 2009/0124352 | A1 | 5/2009 | Gerson | |
| 2009/0286586 | A1 | 11/2009 | Heymann et al. | |
| 2010/0004048 | A1 | 1/2010 | Brito | |
| 2010/0029376 | A1 | 2/2010 | Hardy et al. | |
| 2010/0029378 | A1 | 2/2010 | Gerson et al. | |
| 2010/0048284 | A1 | 2/2010 | Jaffe | |
| 2010/0210356 | A1 | 8/2010 | Losica | |
| 2010/0240456 | A1 | 9/2010 | Goto et al. | |
| 2010/0331071 | A1 | 12/2010 | Uchiyama et al. | |
| 2011/0281627 | A1 | 11/2011 | Lutnick et al. | |
| 2012/0052939 | A1 | 3/2012 | Lutnick et al. | |

FOREIGN PATENT DOCUMENTS

| | | | |
|---|---|---|---|
| GB | 2148037 | | 5/1985 |
| GB | 2335524 | | 9/1999 |
| WO | 2006076424 | A3 | 7/2006 |
| WO | 2006076462 | A3 | 7/2006 |
| WO | 2007076514 | A3 | 7/2007 |
| WO | 2007143704 | A3 | 12/2007 |
| WO | 2008039413 | A3 | 4/2008 |
| WO | 2008051518 | A3 | 5/2008 |
| WO | 2008057188 | | 5/2008 |
| WO | 2008057201 | A3 | 5/2008 |
| WO | 2008060472 | A3 | 5/2008 |
| WO | 2008060473 | A3 | 5/2008 |
| WO | 2009032130 | A3 | 3/2009 |

OTHER PUBLICATIONS

Illinois Lottery Office of the Superintendent Game Rules, Downloaded from the World Wide Web at http://webarchive.org/web/w00611090318 43/http://www.illinoislottery.com/subsections/OnLineRules.htm, downloaded on Sep. 28, 2011 as archived on Nov. 9, 2006.

International Searching Authority, Notification of Transmittal of the International Search Report and the Written Opinion of the International Searching Authority, or the Declaration, for International Application No. PCT/US07/23656, mailed on Aug. 25, 2008.

International Searching Authority, Notification of Transmittal of the International Search Report and the Written Opinion of the International Searching Authority, or the Declaration, for International Application No. PCT/US07/74030, mailed on Sep. 26, 2008.

International Searching Authority, Written Opinion of the International Searching Authority (PCT Rule 43 bis.1), for International Application No. PCT/US07/23658, mailed on Sep. 22, 2008.

United States Patent and Trademark Office, Office Action for U.S. Appl. No. 11/873,740, dated Jun. 9, 2008.

"Nintendogs" instruction booklet by Nintendo of America, Inc., http://www.nintendo.com/consumer/gameslist/manuals/DS_Nintendogs.pdf, Jul. 15, 2005.

International Searching Authority of WIPO, PCT Written Opinion of the International Searching Authority, for International Application No. PCT/US07/22425, mailing date Jul. 24, 2008.

International Searching Authority of WIPO, PCT Written Opinion of the International Searching Authority for International Application No. PCT/US08/10156, mailed on Jun. 25, 2009.

The International Bureau of WIPO, PCT International Preliminary Report on Patentability, for International Application PCT/US2006/000346, report issued on Jul. 8, 2008.

The International Bureau of WIPO, PCT International Preliminary Report on Patentability for International Application PCT/US2006/001034, issued on Nov. 19, 2007.

The Internatonal Bureau of WIPO PCT International Preliminary Report on Patentability, for International Application PCT/US2006/062630, report issued on Jul. 1, 2008.

The Internatonal Bureau of WIPO, PCT International Preliminary Report on Patentability, for International Application PCT/US2007/20589, report issued on Mar. 31, 2009.

The Internatonal Bureau of WIPO, PCT International Preliminary Report on Patentability, for International Application PCT/US2007/022425, report issued on May 12, 2009.

The International Bureau of WIPO, PCT International Preliminary Report on Patentability, for International Application PCT/US2007/022426, report issued on Apr. 28, 2009.

The International Bureau of WIPO, International Preliminary Report on Patentability, for International Application PCT/US2007/022775, report issued on Apr. 28, 2009.

The International Bureau of WIPO, PCT International Preliminary Report on Patentability, for International Application PCT/US2007/023657, report issued on May 12, 2009.

Government of Macao Special Administrative Region, International-Type Search Report and Office Action for application No. 1/0004388(880), cover sheet dated Apr. 17, 2009.

Wikipedia, "Wheel of Fortune," http://en.wikipedia.org/wiki/Wheel_of_Fortune, printed Dec. 8, 2008.

International Searching Authority, PCT Written Opinion of the International Searching Authority (PCT Rule 43 bis.1), for International Application No. PCT/US07/23656, mailed on Aug. 25, 2008.

The International Bureau of WIPO, PCT International Preliminary Report on Patentability, for International Application PCT/US2007/023658, report issued on May 12, 2009.

International Searching Authority, Notification of Transmittal of The International Search Report and the Written Opinion of the International Searching Authority, or the Declaration, for International Application No. PCT/US07/22775, dated Aug. 15, 2008.
U.S. Appl. No. 11/558,405, filed Nov. 9, 2006, inventor Matias Montero and entitled System and Method for allowing piggyback wagering.
U.S. Appl. No. 12/773,847, filed May 5, 2010.
Sony Pictures Television—Wheel of Fortune 20th Anniversary—downloaded from http://webarchive.org/web/20030624010929/http://www.wheeloffortune.com/, Jun. 24, 2003.

* cited by examiner

SLOT MACHINE GAME WITH RESPIN FEATURE WHICH IDENTIFIES POTENTIAL WINS

CROSS REFERENCE TO RELATED APPLICATIONS

This application is a continuation in part of application 11/337,960, filed Jan. 23, 2006, and now abandoned, which is incorporated by reference herein in its entirety.

FIELD OF THE INVENTION

The present inventive concept relates to a slot machine game which allows a player to select a particular reel to respin and identifies potential winning combinations for that selection.

DESCRIPTION OF THE RELATED ART

Slot machine games are known which allow the player to effectuate respins. For example, see patent publication 2006/0160595 to Gerson et al., discloses a slot machine game wherein a player can purchase a reel respin for a particular purchase price based on the game situation.

What is needed is a game which allows a player to respin which also identifies to the player the potential winning combinations the player can win on a respin.

SUMMARY OF THE INVENTION

It is an aspect of the present general inventive concept to provide an improved slot machine game with a respin operation.

The above aspects can be obtained by a method that includes (a) receiving an initial wager from a player; (b) spinning a plurality of reels of a slot machine to an initial outcome; (c) displaying respin information for a particular reel out of the plurality of reels, the respin information comprising information related to potential awards if the particular reel is to be respun; (d) respinning the particular reel to a final outcome; and (e) paying any earned awards using the initial outcome and the final outcome.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 10A is a drawing illustrating exemplary paylines on a three reel machine, according to an embodiment;

DESCRIPTION OF THE PREFERRED EMBODIMENTS

Figure 1:
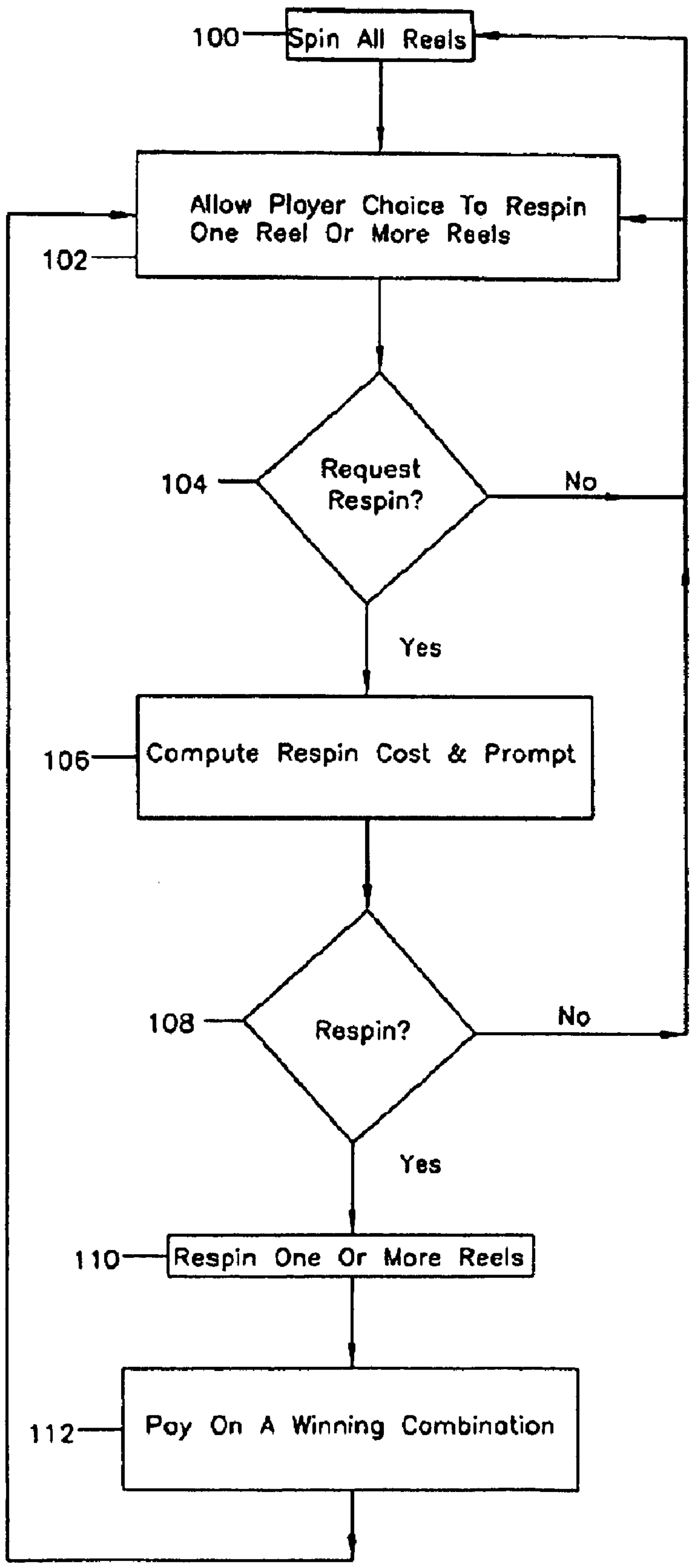
FIG. 1 is a flowchart illustrating an exemplary method of allowing for respins, according to an embodiment.

Reference will now be made in detail to the presently preferred embodiments of the invention, examples of which are illustrated in the accompanying drawings, wherein like reference numerals refer to like elements throughout.

Embodiments of the invention relate to a slot machine game which can allow a player to respin a reel. When the player identifies a reel the player is interested in potentially respinning (but before actually respinning that reel), the game output highlights which lines can potentially earn awards.

FIG. 1 is a flowchart illustrating an exemplary method of allowing for respins, according to an embodiment.

The method can start with operation 100, which spins reels of the slot machine. Typically the player will pay an up-front cost to spin all the reels.

From operation 100, the method proceeds to operation 102, which gives the player a choice to respin a reel. This is offered after the reels have come to a stop from being spun in operation 100. The player can then inspect the reels too see if he or she wishes to respin one or more reels. For example, if the player is one symbol away from winning a jackpot, the player may find it desirable to try and respin for additional chances to win that jackpot.

From operation 102, the method proceeds to operation 104, which determines if the player has requested a respin. If the player does not wish to respin, the player can simply press a "spin" button as if there was no respin option and play again. The method can then return to operation 100 which begins a new game.

Alternatively, the player can request to respin. This can be done by pressing a reel, symbol, or button associated with a reel or symbol which indicates that the player wishes to respin a particular symbol or reel. Note that either an individual symbol can be respun (if the slot machine uses symbols that are on an individual reel), or an entire reel (such as a vertical column) can be respun.

If the determination in operation 104 determines that the player wishes to respin, then the method proceeds to operation 106 which computes the cost for the respin and prompts this cost to the player. More on computing the cost will be discussed below in more detail.

From operation 106, the method then proceeds to operation 108 which determines whether the player has decided to respin. If, after viewing the cost, the player then decides not to respin, the player can indicate his or her desire by pressing a "decline" button on the screen, by pressing a standard spin button, or by any other ways using the chosen interface to decline. If the cost for the respin is high, the player may decide that he or she would rather not respin, upon which he or she declines and the method can then return to operation 100, which begins a new game. From operation 108, the method can alternatively return to operation 102, which allows the player to select a different reel to respin. Perhaps a player may decline to respin one reel based on the cost but choose to respin another. A player can typically view the cost to respin all of the reels without actually respinning them.

If in operation 108 the player has decided to proceed with the respin after viewing the cost, the method proceeds to operation 110 which respins the reel. If the player does not have sufficient credits in order to purchase the respin, the player can insert additional credits to increase his or her balance. The individual reel that player has selected to respin will spin again, but the other reels will remain the same.

From operation 110, the method proceeds to operation 112, which pays on a winning combination on the respin, typically using the same standard paytable as used during the initial game (in operation 100). From operation 112, the method can return to operation 102, which allows the player an opportunity to respin again.

The cost for the respin depends on the particular reel selected to respin, the positions of the remaining reels (or symbols), the payout table, the current active paylines, and the house advantage for a respin.

Figure 2:
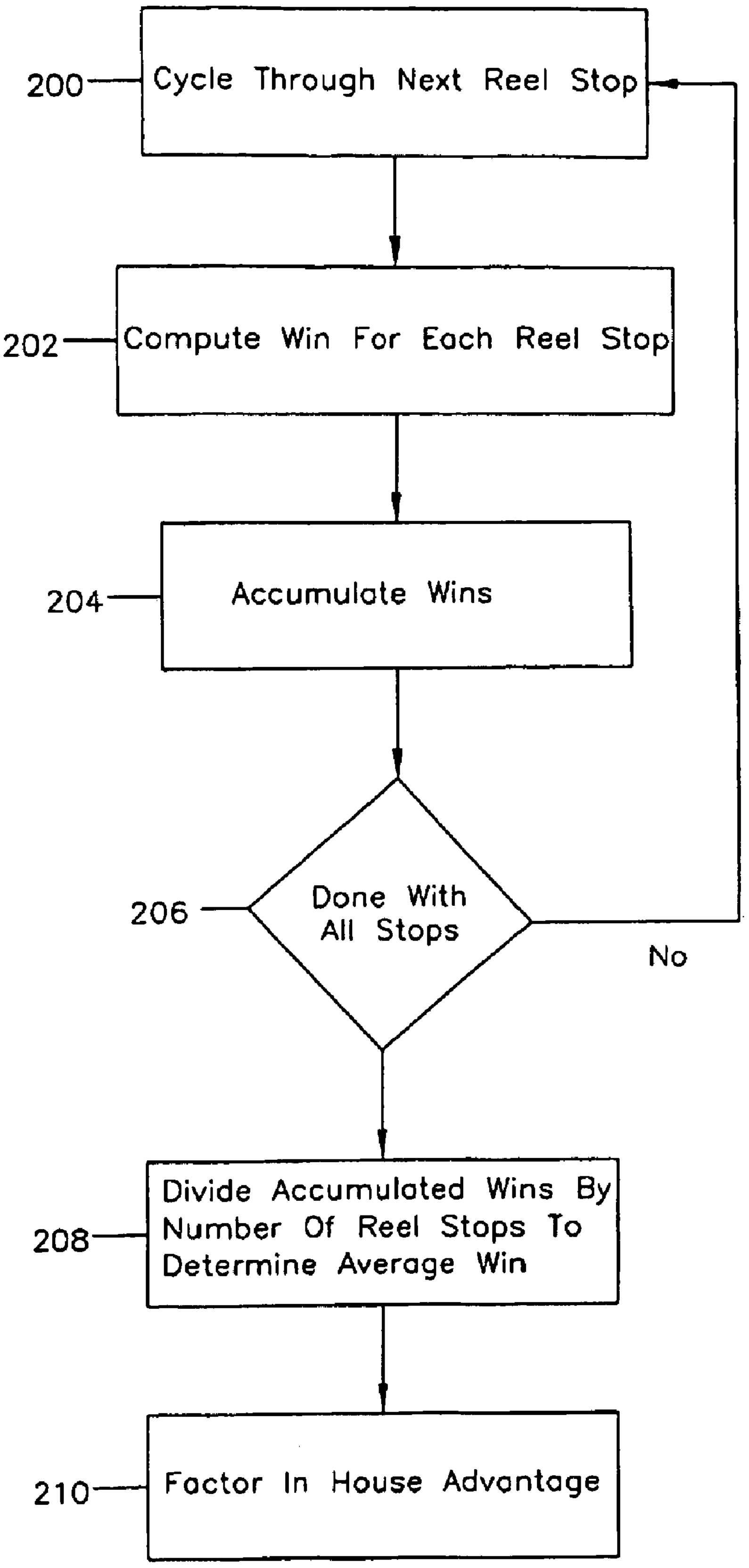
FIG. 2 is a flowchart illustrating an exemplary method to compute a cost for a respin, according to an embodiment.

FIG. 2 is a flowchart illustrating an exemplary method to compute a cost for a respin, according to an embodiment.

The method starts at operation 200, which cycles through a next reel stop. The present invention can use 256 (or any number) of reel stops. Each reel stop has a symbol on it.

From operation 200, the method proceeds to operation 202, which computes a win for the current reel stop. The win is computed by comparing the current paylines to a paytable to see which lines are winners and how much. In one embodiment, only wins that involve the respin are paid. For example, if a prize only involves reels 1, 2 and 3, then this prize won't be paid again for a respin of reel 5. Thus, a check can be done to see if the respun reel has a symbol which is used in determining a current prize on a payline. Alternatively, a respin can award all prizes which involve any of the reels, but of course this will be factored into the cost of the respin.

From operation 202, the method proceeds to operation 204, which accumulates wins on all of the current active paylines. Alternatively, all paylines can be active during a respin.

From operation 204, the method proceeds to operation 206, which checks if it is done with all the stops. If the method is not done, then the method returns to operation 200 which proceeds to the next symbol.

If the check in operation 206 determines that all stops have been accounted for, then the method proceeds to operation 208 which divides the accumulated wins by the number of symbol stops on the reel (the reel length). This results in an average win when that particular reel is respun.

From operation 208, the method proceeds to operation 210 which then factors in a house advantage into the cost computed in operation 208. The cost of the respin determined as described above would result in a break-even wager for the house (absent any rounding effects).

One way a house advantage can be incorporated into the computed cost is to multiply the cost by a house commission. For example, if the house wishes to earn 10% on all respins, then if the cost for a particular respin is determined above to be $100, then the method can multiply $100 (the computed cost) by 1.10 (the commission) which equals $110. Thus, a respin in this example would cost the player $110. Alternatively, this can also be computed by taking the cost of the respin and dividing it by a constant (such as 0.9). The value obtained for the cost of the respin after factoring in the house advantage can be rounded to the upper nearest integer value. The rounding may be forced higher, e.g. 1.4 will be rounded to 2.

The player will of course have no way to know how much of the cost goes towards the house advantage. The house advantage on a respin can be set higher than the house advantage than the basic game itself, it can be equal, or it can be set lower. If a win is not possible (e.g. an average computed win of $0), then a respin can cost $1 or else may not be permitted since some jurisdictions may prohibit a machine from taking a guaranteed losing wager.

Figure 3:
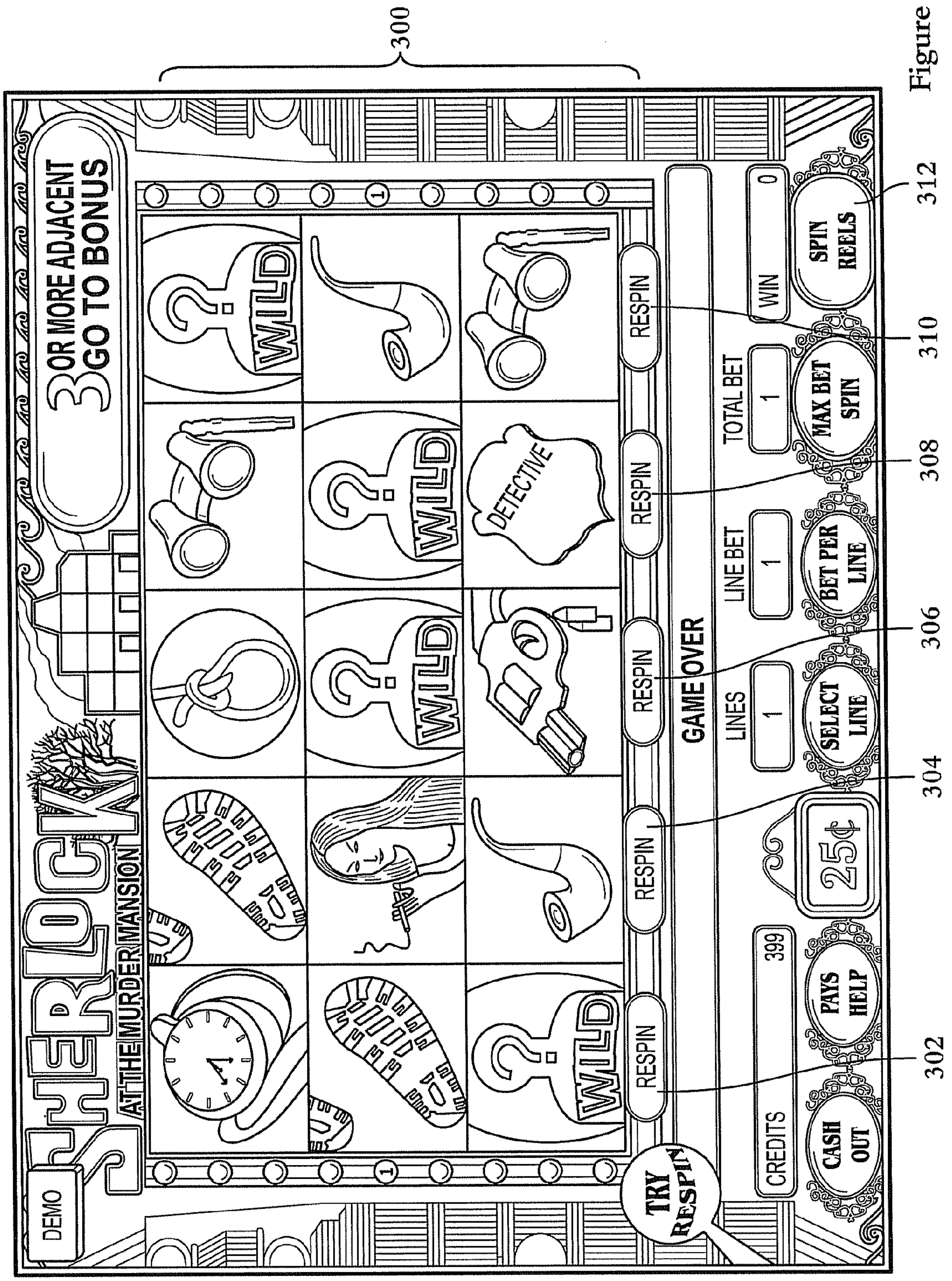
FIG. 3 is a screen shot illustrating a five reel game with a respin button for each reel, according to an embodiment.

FIG. 3 is a screen shot illustrating a five reel game with a respin button for each reel, according to an embodiment.

A five reel display 300 is shown, although the present general inventive concept can be applied to a game with any number of reels. Respin buttons 302, 304, 306, 308, 310 are each associated with a reel and can be used by the player to select to respin a respective reel. A spin button 312 is used to spin the reels. The spin button 312 can be used to initially spin the reels or to start a new game by spinning all of the reels without choosing to respin.

If a player wishes to respin a reel, then he can select the respective respin button. In this example, the player has achieved wild symbols in reel 1, reel 3, reel 4, and reel 5. If the player can achieve a wild symbol in the middle symbol of reel 2, this would give the player 5 wilds on a particular payline. Thus, the player may wish to respin reel 2.

Figure 4:
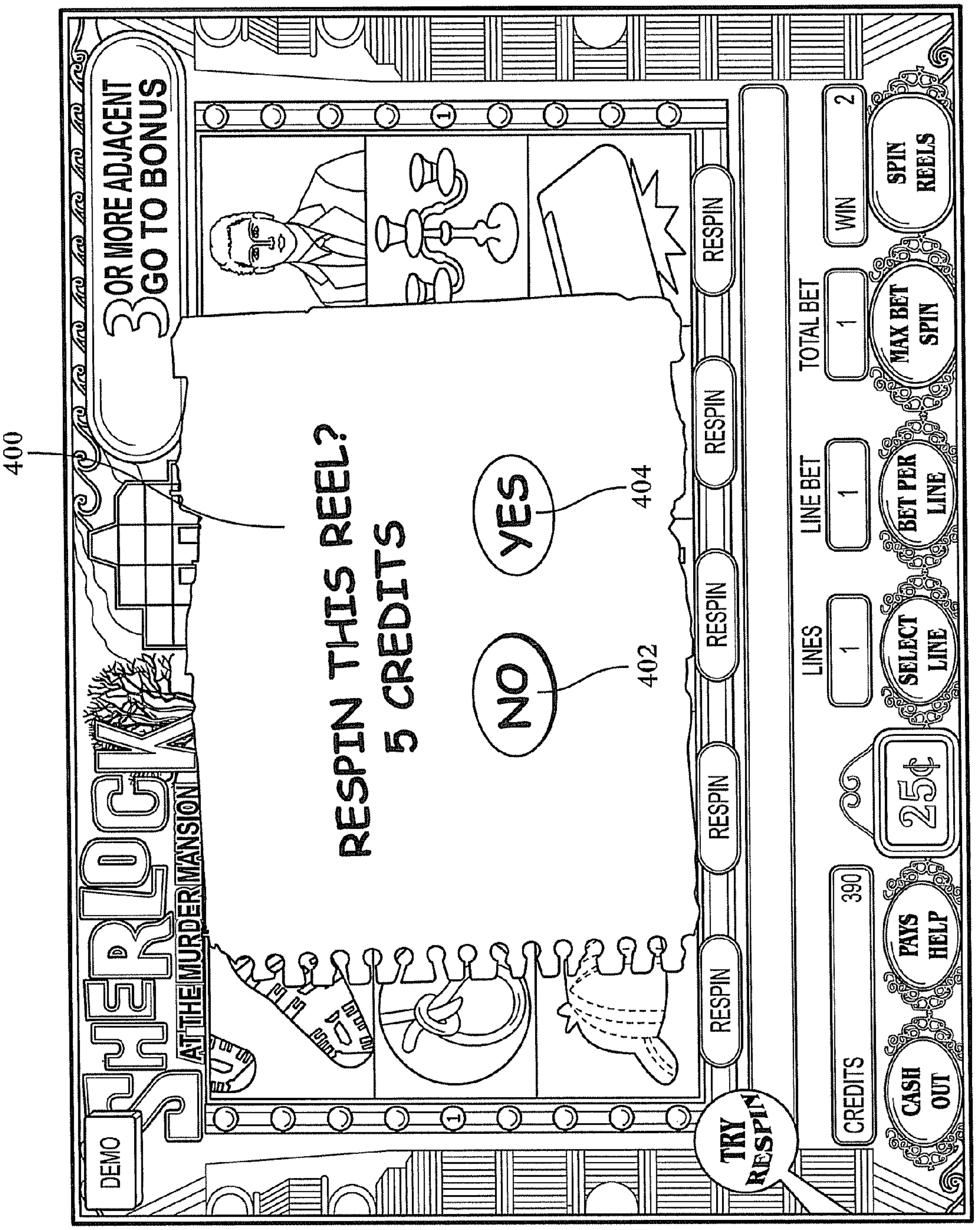
FIG. 4 is a screen shot illustrating a prompt screen prompting whether to respin, according to an embodiment.

FIG. 4 is a screen shot illustrating a prompt screen prompting whether to respin, according to an embodiment.

A respin prompt window 400 displays to the player how much a selected respin will cost. A decline button 402 allows the player to decline a respin, while an accept button 404 allows the player to confirm the respin at the displayed cost. This corresponds to operation 106 of FIG. 1.

In a further embodiment of the present general inventive concept, a bonus game can be implemented. A bonus game is a game which is triggered by achieving a predetermined combination of symbols from the main game. For example, getting three fingerprint symbols can trigger the bonus game, although of course any other known bonus trigger can be used.

A bonus round can be implemented wherein predetermined selections are made by the machine, and the player tries to guess the selections. Hints may be provided to the player. Each time the player enters the bonus round, the player has an additional chance to guess at the predetermined selections. The predetermined selections should not change until the player successfully selects them (or possibly when a new player plays the game), upon which a prize is awarded. This will be more easily illustrated by the following figures and examples.

Figure 5:
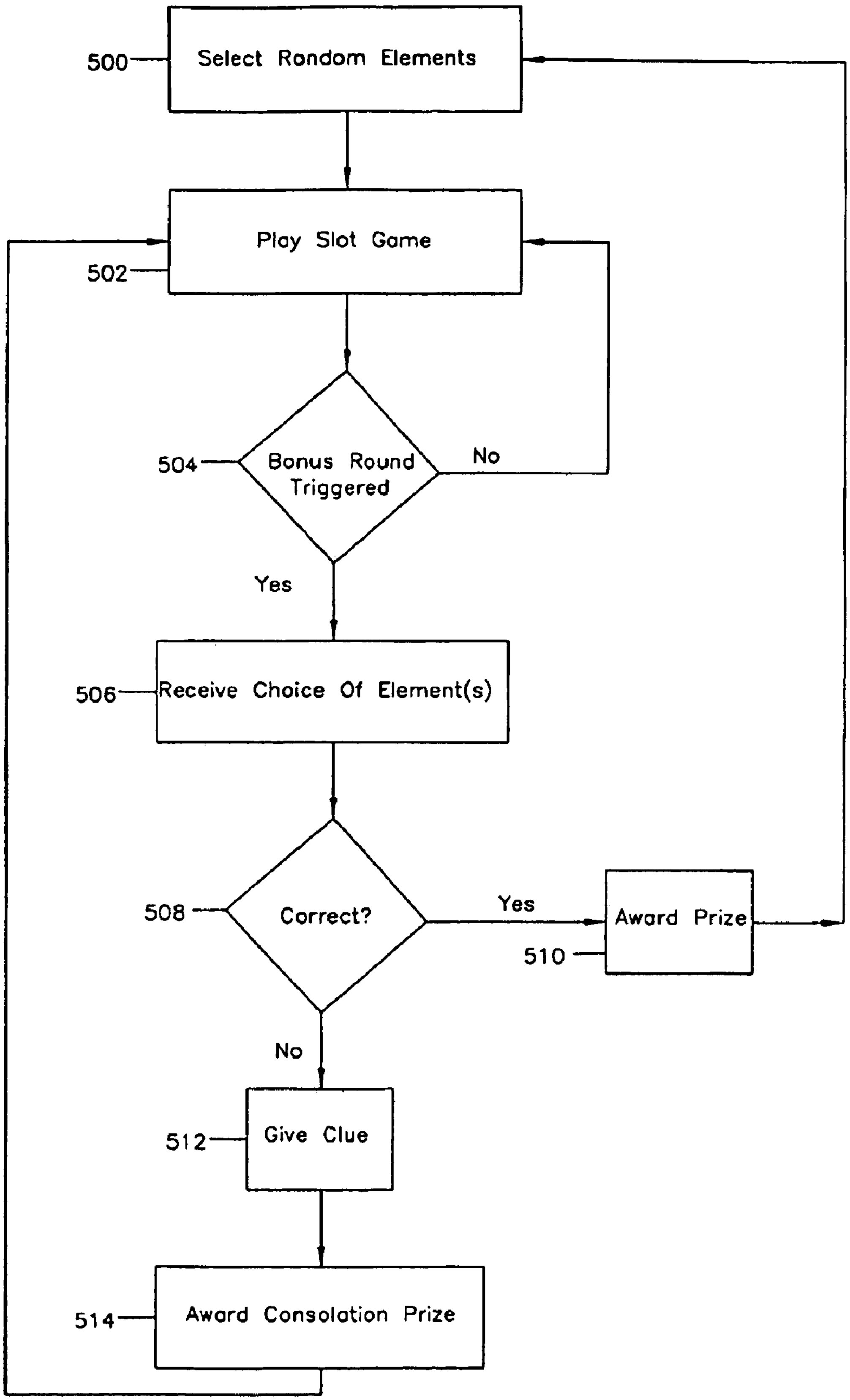
FIG. 5 is a flowchart illustrating an exemplary method to implement a bonus game, according to an embodiment.

FIG. 5 is a flowchart illustrating an exemplary method to implement a bonus game, according to an embodiment.

The method starts with operation 500, which automatically selects random elements. The random elements can be, for example, a murder weapon and a murder suspect. Of course any other type of theme can be used as well. Also, the present general inventive concept is not limited to two elements, but one, three, or any other number can be selected.

From operation 500, the method proceeds to operation 502 which plays the slot game. A player pays for and spins the reels as typically done.

From operation 502, the method proceeds to operation 504, which determines if a bonus round has been triggered. If a bonus round has not been triggered, then the method returns to operation 502 which continues to play the slot game. The respin embodiment described earlier can optionally be incorporated into the bonus game described herein.

If the bonus round has been triggered, then the method proceeds to operation 506 which receives a choice of elements from the player. Elements can be displayed to the player, and the player can pick one or more elements. The player is attempting to guess the selected elements selected in operation 500.

From operation 506, the method proceeds to operation 508, which determines if the player's choice in operation 506 is correct. If more than one element is selected in operation 500, then the player should guess all of these elements correctly in order to be considered correct.

If the player's choice of elements in operation 506 is not correct, then the method proceeds to operation 512 which gives the player a clue as to the correct selected elements. This operation can be optional.

From operation 512, the method proceeds to operation 514, which awards a consolation prize to the player. A consolation can be computed by the consolation prize can be determined by choosing a random value from a table of predetermined values. The average of this value can be lower than the prize that the player can obtain by guessing all of the elements correctly.

From operation 514, the method then returns to operation 502, which allows the player to continue to play the game. Since the player has received a hint, the player now may have a better chance of correctly guessing the selected elements when the player makes it to the bonus round again.

If the method in operation 508 determines that the player's choice in operation 506 was correct, then the method proceeds to operation 510 which awards a prize. An indication is presented to the player that the player has successfully made the proper choice(s). A large prize is typically awarded for the successful completion of the bonus round. The method can then proceed to operation 500, which can select random elements (anew) and start the method over again.

Figure 6:
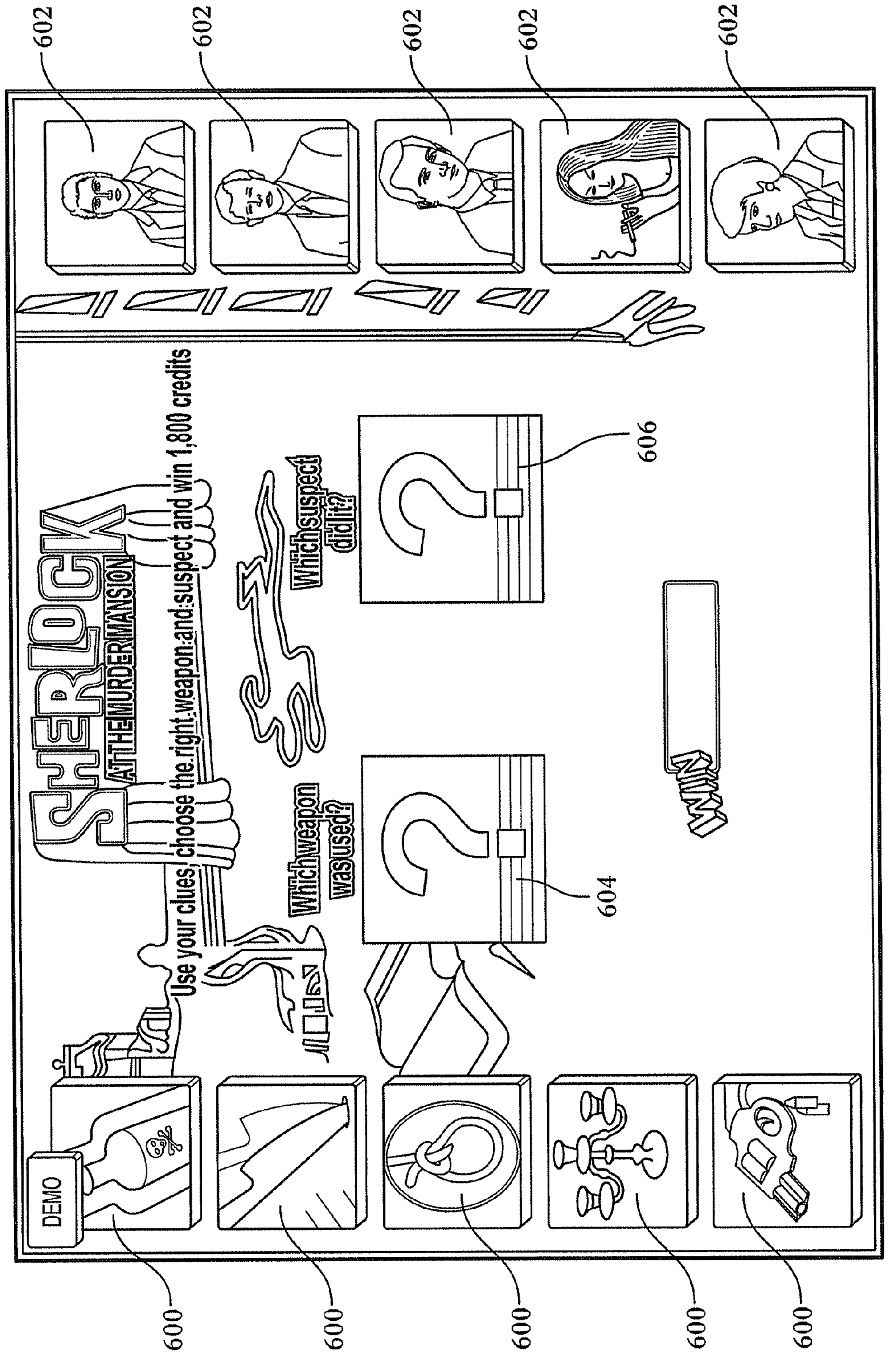
FIG. 6 is a screen shot illustrating an exemplary bonus game, according to an embodiment.

FIG. 6 is a screen shot illustrating an exemplary bonus game, according to an embodiment.

A first set of items 600 is displayed. In this example, the first set of items represents murder weapons, although any type of set or theme can be used. A second set of items 600 is displayed that represents suspects. Again, any type of set or theme can be used. Further, only one set can be used, two sets (as pictured) can be used, three or any number can also be used.

The player chooses one element from each displayed set (in this case the first set and the second set), in order to correctly guess the selected elements. This can be correlated to operation 506 from FIG. 5. The player's first choice box 604 and the player's second choice box 606 display the player's choices; each (or both) can be empty before the player has chosen the respective elements.

Figure 7:
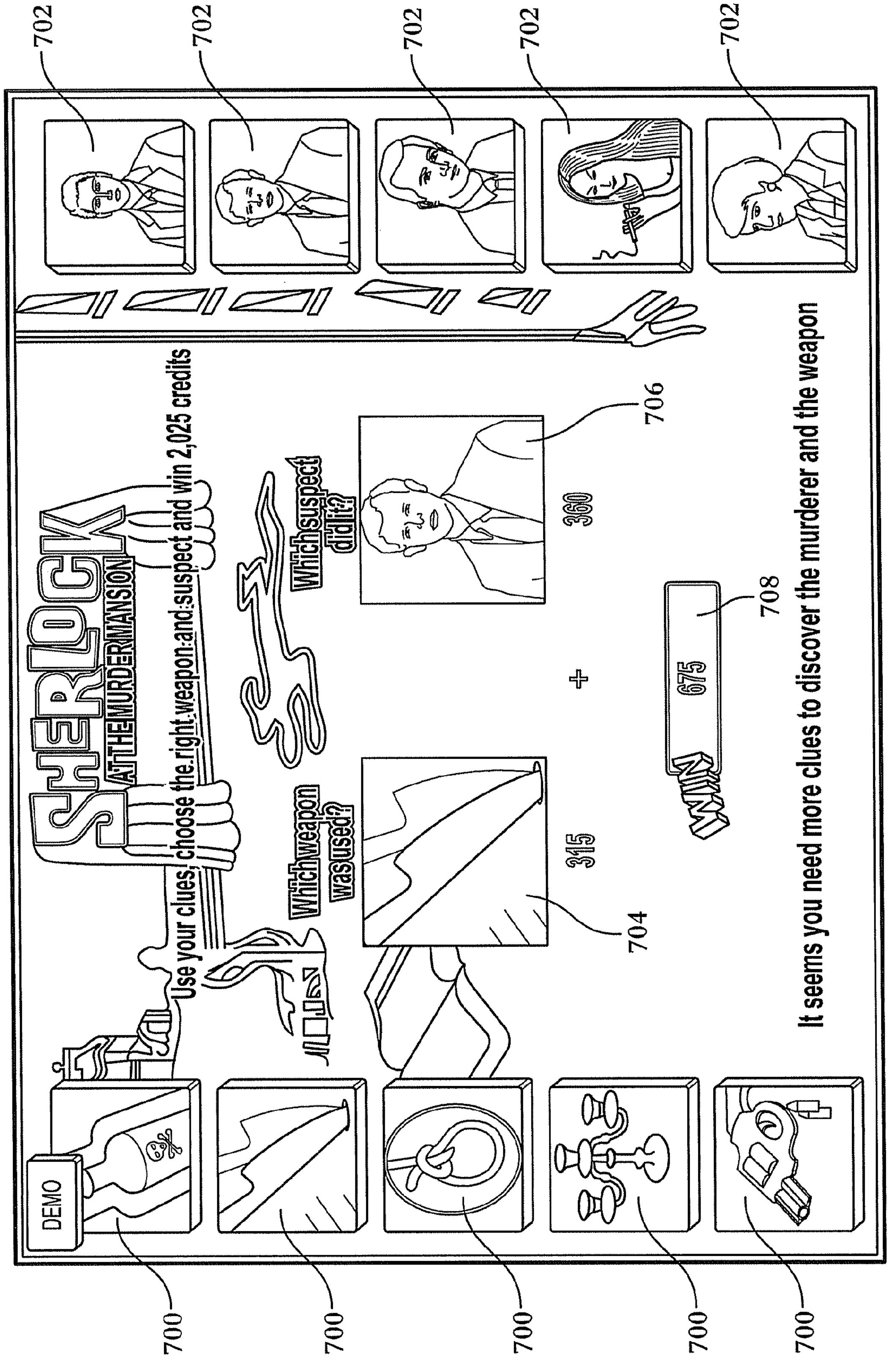
FIG. 7 is a screen shot illustrating an exemplary bonus game after items are chosen by the player, according to an embodiment.

FIG. 7 is a screen shot illustrating an exemplary bonus game after items are chosen by the player, according to an embodiment.

First set of items 700 and second set of items 702 are displayed. A first choice box 704 displays the player's choice for the first item, and the second choice box 706 displays the player's choice for the second item.

In this example, the player guessed wrong on both sets, and he receives a consolation prize amount 708. This corresponds to operation 514 in FIG. 5.

Figure 8:
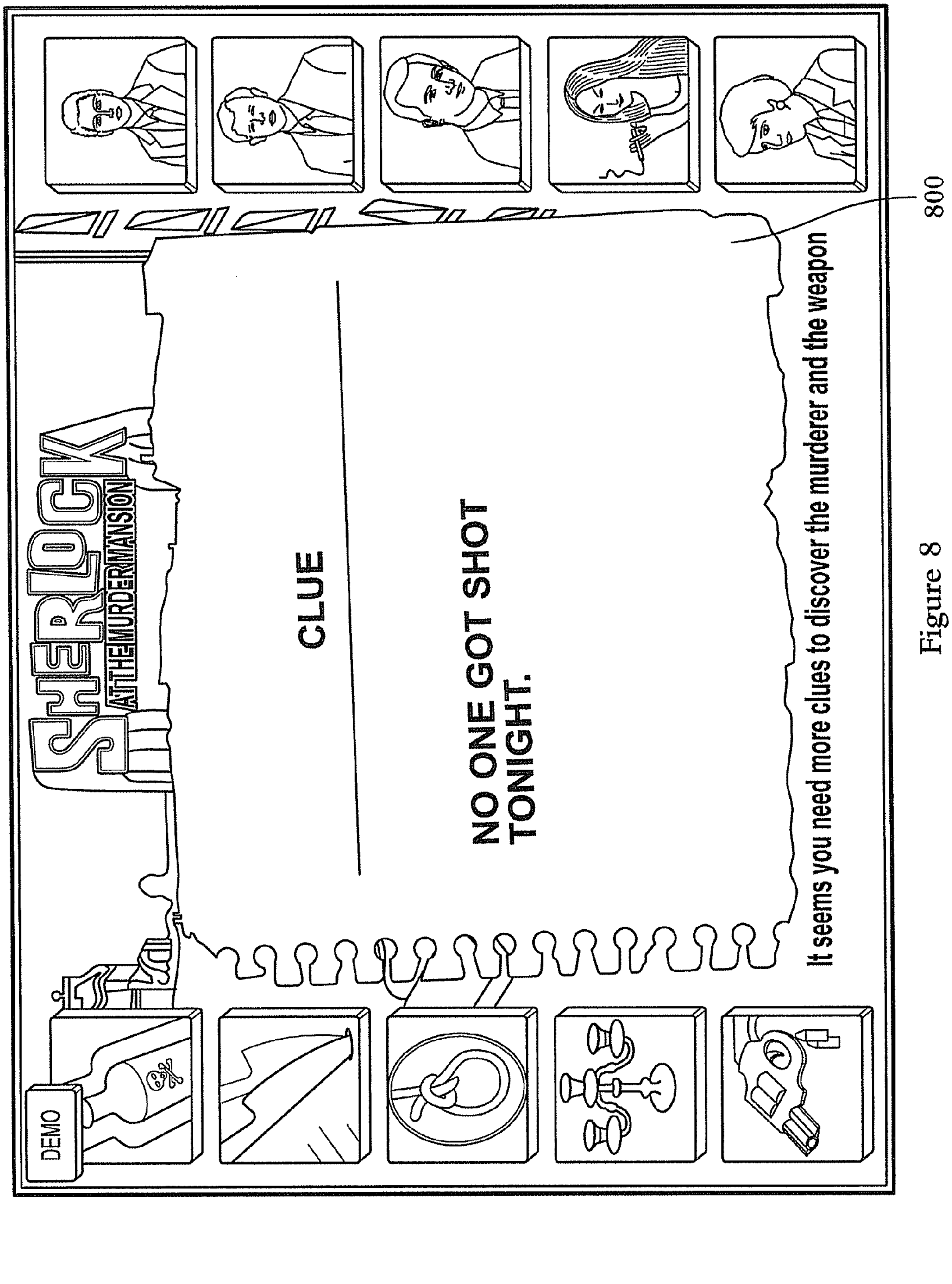
FIG. 8 is a screen shot illustrating an exemplary hint screen for a bonus game, according to an embodiment.

FIG. 8 is a screen shot illustrating an exemplary hint screen for a bonus game, according to an embodiment.

A clue display 800 is presented to the player which gives the player a clue as to which element(s) are selected. This corresponds to operation 512 in FIG. 5. The player will now have a better chance at choosing the proper elements the next time the player makes it to the bonus round.

Table I of application Ser. No. 11/035,691 is incorporated by reference herein and illustrates an example set of five reels and a frequency of particular symbols therein. Table II of application Ser. No. 11/035,691 is incorporated by reference herein and illustrates an actual mapping of the symbols for each reel. Table III of application Ser. No. 11/035,691 is incorporated by reference herein and is a legend designating a particular symbol for each number used in Table II of that application. Table IV of application Ser. No. 11/035,691 is incorporated by reference and is an exemplary paytable for a configuration of the game. In Table IV is listed each symbol, a quantity of that symbol, and a respective payout. Table V of application Ser. No. 11/035,691 is incorporated by reference and illustrates an example of payout percentages and volatility for a configuration of the game. Main payout is the percentage of coin in returned in the main game, bonus payout is the percentage of coin in returned in the bonus round, and progressive saving is the percentage of coin in used to contribute to a progressive jackpot. Hit ratio (1 payline) is the hit ratio for one payline, hit ratio (9 paylines) is the hit ratio for 9 paylines, and volatility is the volatility of the game (a measure of the riskiness). Table VI of application Ser. No. 11/035,691 is incorporated by reference and illustrates exemplary payouts for the bonus game, according to an embodiment. After the player selects a suspect and a weapon, if both selections are correct, then two values from the high set are chosen using the associated probability weights. If either selection (the suspect or the weapon) is incorrect, then two values from the low set are chosen using the associated probability weights. The two chosen values are awarded as the bonus amounts and can be multiplied by the amount bet. The machine may optionally display the maximum (and/or the minimum) bonus amount the player can win in the bonus round.

The examples in all tables are merely examples, and the present methods described herein can be implemented using any slot machine game parameters, e.g. any number of reels, reel stops, paylines, etc.

In a further embodiment, before respinning a particular reel, respin information can be presented to the player before the player pays for and respins the particular reel. Such respin information can comprise (but not limited to) potential winning lines, potential awards, maximum awards, etc.

Figure 9:
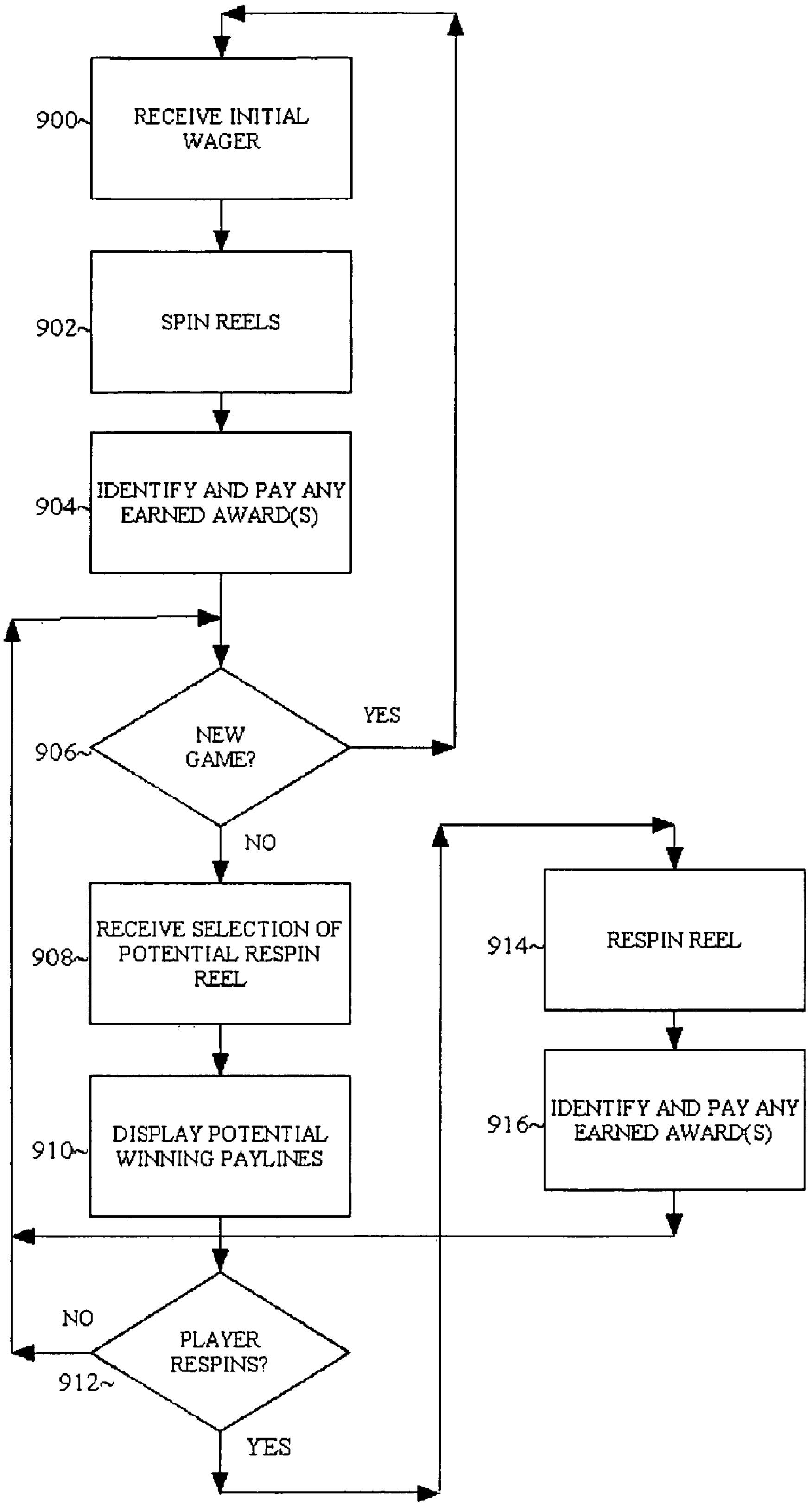
FIG. 9 is a flowchart illustrating an exemplary method of displaying identified potentially winning lines for a reel respin, according to an embodiment.

FIG. 9 is a flowchart illustrating an exemplary method of displaying identified potentially winning lines for a reel respin, according to an embodiment.

The method can start with operation 900, which receives the player's initial wager. This is done as known in the art, such as by the player pressing a "spin" button which deducts credits from the player's credit meter.

From operation 900, the method can proceed to operation 902, which spins the reels on the slot machine. This can be done as known in the art, such as animating spinning reels on a video slot game, or spinning physical reels on a mechanical slot game. The reels will come to a stop at an outcome position (also referred to as an initial outcome). This outcome position is typically used to pay some or the entire initial wager placed in operation 900.

From operation 902, the method can proceed to operation 904, which identifies and pays any earned awards based on the outcome position. The symbols in the outcome position are used to form paylines, and the symbols in each respective payline are compared to a paytable to determine whether each payline is a winner. Any winning paylines are paid respective awards based on the paytable (e.g., how much the winning combination pays) and the wager for that line (which is part of the initial wager).

From operation 904, the method can proceed to operation 906, which determines whether to begin a new game. If the player wishes to start a new game, the player can indicate this desire in a number of ways, such as pressing a button (real or virtual), on the machine (e.g., "spin" button). If the player wishes to get more information on respinning, then the player can indicate this desire (e.g., by pressing a button) and the method can proceed to operation 908.

In operation 908, the player can select which reel the player is interested in respinning. Alternatively, in operation 906 the player can press a button indicating which reel (e.g., there can be a separate button for each reel) the player selects for possible respinning (which is how the player indicates the player wants to get more information on respinning in operation 906). In this latter case, then no additional input is necessary from the player in operation 908.

From operation 908, the method proceeds to operation 910, which displays potential winning paylines for the reel selected. For example, when the player selects a particular reel to respin, this operation will highlight to the player which paylines may have winning combinations after the selected reel is respun. Depending on the outcome combination (from operation 902), it might be the case that only certain paylines may possibly have winning combinations.

Displaying this information to the player should typically make it easier for the player to identify what awards the player could potentially win if the player respins a particular reel (or symbol), thus possibly encouraging the player to do so. The potential winning combinations can be determined as described with respect to FIG. 12. In addition to potential winning paylines, any other respin information can be displayed as well, such as potential payouts, maximum win, etc.

From operation 910, the method can proceed to operation 912, which determines whether the player now wishes to actually respin the selected reel or not. The player can press a particular button to respin the reel, or press a different button to either return to operation 908 (to select a different reel to potentially respin), or to return to operation 900 and begin an entirely new game.

If, in operation 912, the player decides to respin, then the method can proceed to operation 914, which respins the selected reel. The respin can cost the player a particular amount of credits (as described herein), or in another embodiment, the respin can be free. The game rules can require that a reel is respun after the initial spin (always or upon a condition), or that a respin can be optional.

From operation 914, the method can proceed to operation 916, which identifies and pays any earned award(s) after the respin.

Thus, an advantage to the method in FIG. 9 is that the player is presented with the ability to see which possible lines can have winning combinations if a selected reel is respun. The player can also be presented with which particular winning combinations may be available if the player respins a selected reel.

FIG. 10A is a drawing illustrating exemplary paylines on a three reel machine, according to an embodiment.

Illustrated is a three reel by reel slot machine, although of course any configuration of slot machine can be used (e.g., five reel with three vertical symbols, etc.) The game can spin vertical reels, or individual symbols can spin on their own reel (independently spinning symbol). For simplicity, an example game using a 3×3 configuration will be presented.

Paylines can be chosen somewhat arbitrarily by the game designers. In this example, there are only five paylines, but it can be appreciated that many other paylines can be used. In a three by three reel configuration, there can be a maximum of up to 27 paylines (3^3). Players can select how much they wish to bet on each payline, although typically the player would bet an equal amount on each payline.

Figure 10B:
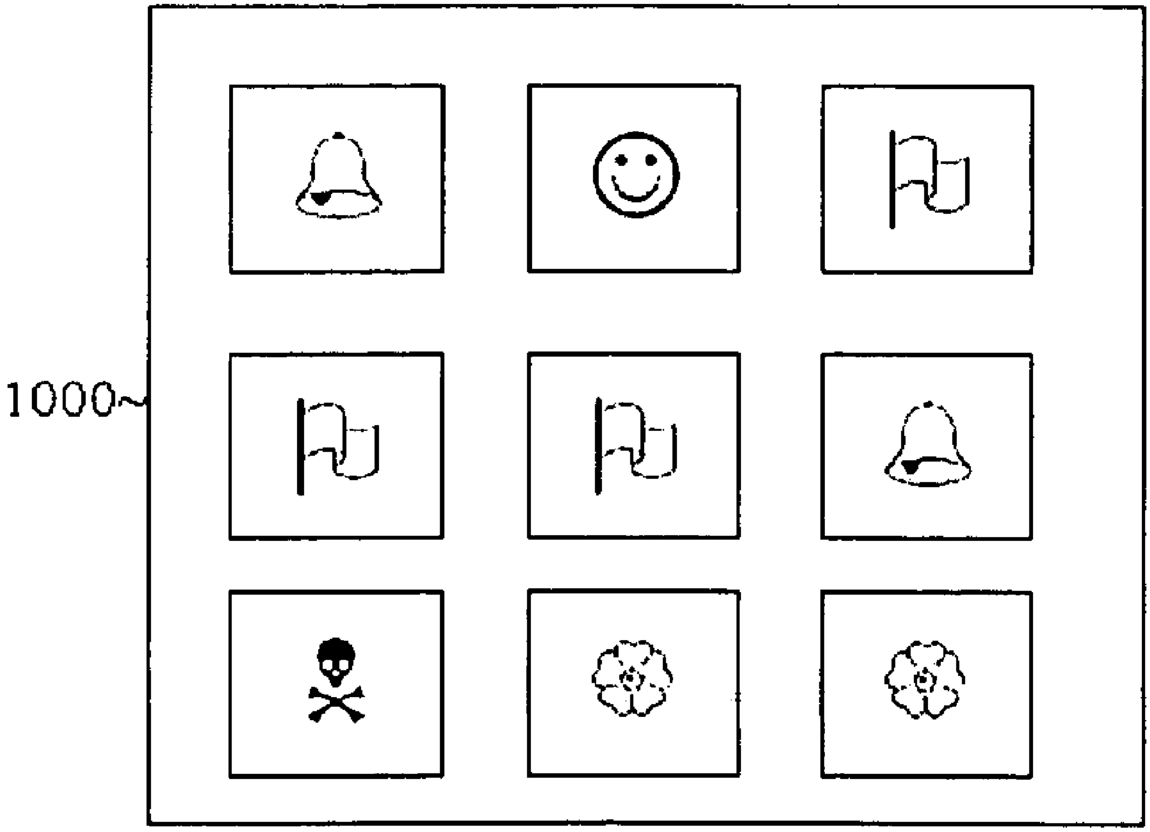
FIG. 10B is a drawing illustrating an exemplary game outcome, according to an embodiment.

FIG. 10B is a drawing illustrating an exemplary game outcome, according to an embodiment.

Table I below illustrates an exemplary paytable of a sample slot machine game.

TABLE I

| | |
|---|---|
| SMILEY/SMILEY/SMILEY | $ 10 |
| FLAG/FLAG/FLAG | $ 20 |
| BELL/BELL/BELL | $ 50 |
| FLOWER/FLOWER/FLOWER | $100 |
| SKULL/SKULL/SKULL | $500 |

The player places an initial wager (operation 900), spins the reels (operation 902), and an initial game outcome 1000 is what occurs. Assume the player places a $5 wager, $1 for each of the 5 paylines illustrated in FIG. 10A. In this example, the player has not made a winning combination (according to the winning payouts from Table I). If the player had made a winning combination, then the player would be paid based on the payout for the winning combination and the bet for the respective payline.

Figure 11:
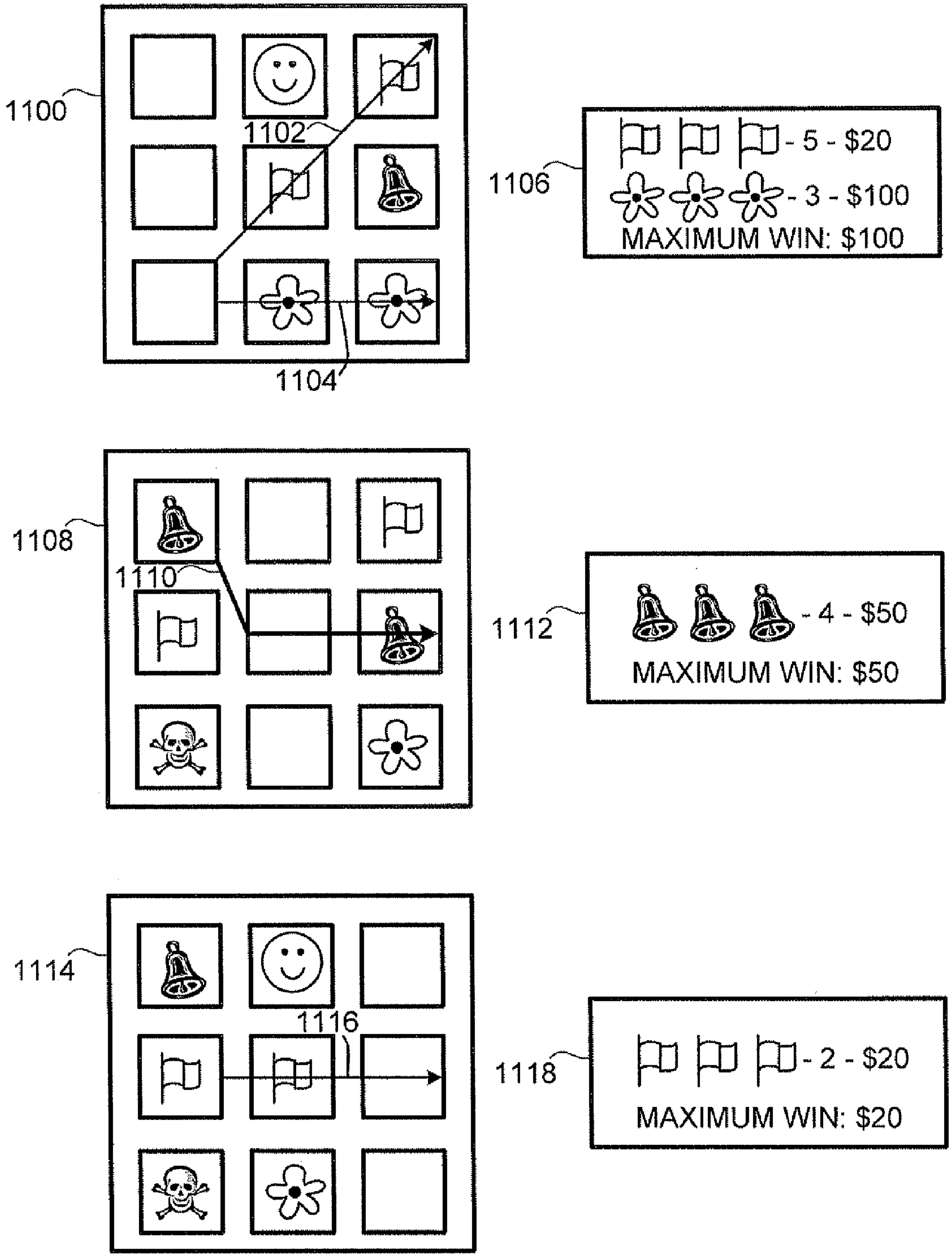
FIG. 11 is a drawing illustrating identifying potentially winning lines for reel respins, according to an embodiment.

FIG. 11 is a drawing illustrating the identifying of potentially winning lines for reel respins, according to an embodiment.

A first reel respin output 1100 is displayed to the player when the player selects the first reel (in operation 906 or 908) to potentially respin. The symbols in the column for the reel that the player wishes to respin can be portrayed as blank (since these symbols will be replaced after the selected reel is respun). The first reel respin output 1100 shows a first potentially winning payline 1102 and a second potentially winning payline 1104. Based on the symbols in reels (columns) two and three, there can be only two possible winning combinations if the first reel is respun. If the player gets a flag in the bottom left symbol, the player would then have three flags in payline 5, on the first potentially winning payline 1102 (see FIG. 10A). If the player gets a flower in the bottom left symbol, then the player would then have three flowers in payline 3, on the second potentially winning payline 1104 (see FIG. 10A).

An optional first reel respin additional output 1106 shows the possible winning combinations, their respective payline that they can be formed on, and the amount the player would win if that respective combination was actually formed after the respin. In this case, displayed in the first reel respin additional output 1106 are three flags, which can be achieved on payline 5, which would pay $20, and three flowers, which can be achieved on payline 3, which would pay $100. Note that it would not be possible in this example to win both of these combinations, since they involve the same symbol (the bottom left symbol), and the game does not have any wild symbols. A maximum win is also displayed to the player indicating the maximum the prize the player could win after respinning the first reel. In some cases, more than one winning combination may be possible on a respin of the selected reel, and the maximum win would equal the maximum amount the player could possible win when respinning the reel. For example, if this particular game used a wild symbol, then it would be possible for the player to win both of the shown winning combinations (the three flags and the three flowers, since the wild symbol could take on both of these values simultaneously) and then the maximum win would be shown to be $120.

If each symbol is an independently spinning symbol, then the maximum win would typically be the sum of the highest possible payout for each payline after the selected reel is respun. If each column spins as a reel, then the highest possible payout (maximum win) might be less than the prior computation because the reel mapping may not allow for all potential winging combinations to be won.

A second reel respin output 1108 is displayed to the player when the player selects the second reel (in operation 906 or 908) to potentially respin. The symbols in the column for the reel that the player wishes to respin can be portrayed as blank (since these symbols will be replaced after the selected reel is respun). The second reel respin output 1100 shows a third potentially winning payline 1110, which is payline 4 from FIG. 10A. The player can get three bells on payline 4 to win that award, although no other award is available to the player if the player respins the second reel.

An optional second reel respin additional output 1112 shows the possible winning combinations, their respective payline that they can be formed on, and the amount the player would win if that respective combination was actually formed after the respin. In this case, displayed in the second reel respin additional output 1112 are three bells, which can be achieved on payline 4, which would pay $50. The maximum win if the second reel is respun would be $50, since this is the only combination the player can potentially be awarded. If the player respins and does not achieve three bells on line 4, then the player would not win an award on the respin.

A third reel respin output 1114 is displayed to the player when the player selects the third reel (in operation 906 or 908) to potentially respin. The symbols in the column for the reel that the player wishes to respin can be portrayed as blank (since these symbols will be replaced after the selected reel is respun). The third reel respin output 1114 shows a fourth potentially winning payline 1116, which is payline 2 from FIG. 10A. The player can get three flags on payline 2 to win that award, although no other award is available to the player if the player respins the third reel.

An optional third reel respin additional output 1118 shows the possible winning combinations, their respective payline that they can be formed on, and the amount the player would win if that respective combination was actually formed after the respin. In this case, displayed in the third reel respin additional output 1118 are three flags, which can be achieved on payline 2, which would pay $20. The maximum win if the third reel is respun would be $20, since this is the only combination the player can potentially be awarded. If the player respins and does not achieve three flags on line 2, then the player would not win an award on the respin.

The winning paylines available for a reel respin (displayed in operation 910) can be determined in a number of ways. For example, a table can be used of all reel positions of all reels, which also contains the data (potentially winning paylines, potentially winning combinations, maximum award, etc.) which are precomputed and prestored.

Alternatively, the data can be determined using an iterative approach. Thus, for the reel that is selected to potentially be respun (the reel has not yet actually been respun), the information outputted in operation 910 (and as illustrated in FIG. 11) needs to be determined.

Figure 12:
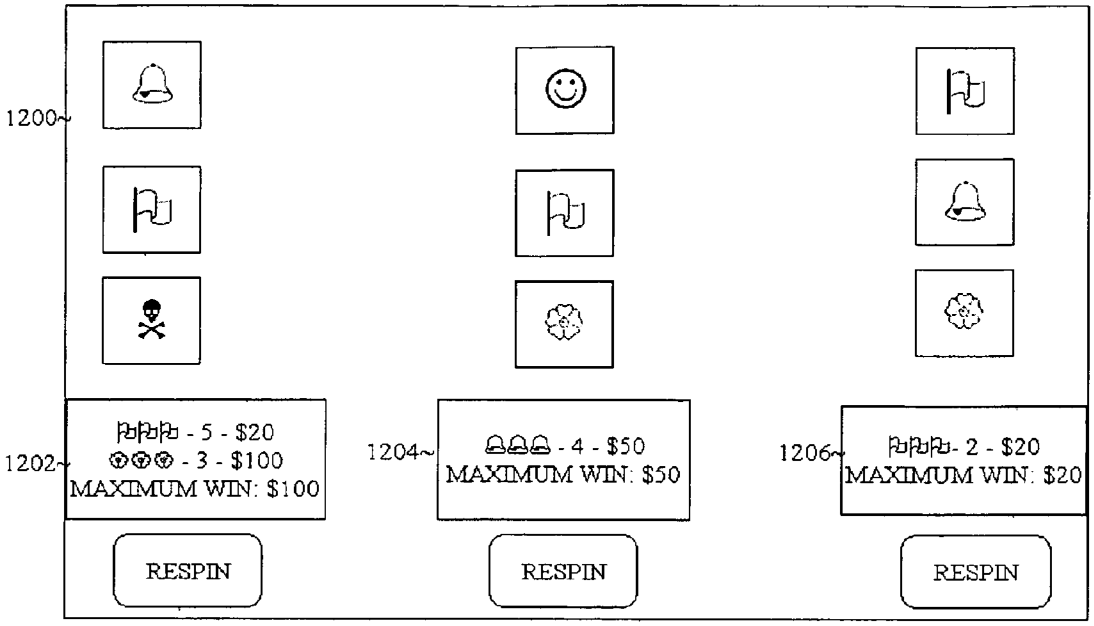
FIG. 12 is a drawing illustrating a game output showing simultaneous respin information, according to an embodiment.

In a further embodiment, the player can be presented with respin information (e.g., potential winning paylines, potential winning payouts, maximum win, etc.) for all reels on the machine simultaneously, instead of the player having to first select reel to potentially respin before viewing the respin information for that reel FIG. 12 is a drawing illustrating a game output showing simultaneous respin information, according to an embodiment.

The game output 1200 shows the initial outcome illustrated in FIG. 10B, but now with simultaneous respin information. Thus, the player can look at the output and know all of the respin information without having to be prompted to enter each particular reel.

First reel respin information 1202 shows respin information if the first reel is respun. Second reel respin information 1204 shows respin information if the second reel is respun. Third reel respin information 1206 shows respin information if the third reel is respun. While not pictured, the respin cost for each reel can also be displayed in each reel's respective respin information. Respin information can contain more (or less) information than illustrated herein, and the respin information shown herein is merely exemplary.

If the embodiment as illustrated in FIG. 12 is implemented, then the player does not have to communicate to the game the reel the player wishes to respin in order to view the respective respin information.

Figure 13:
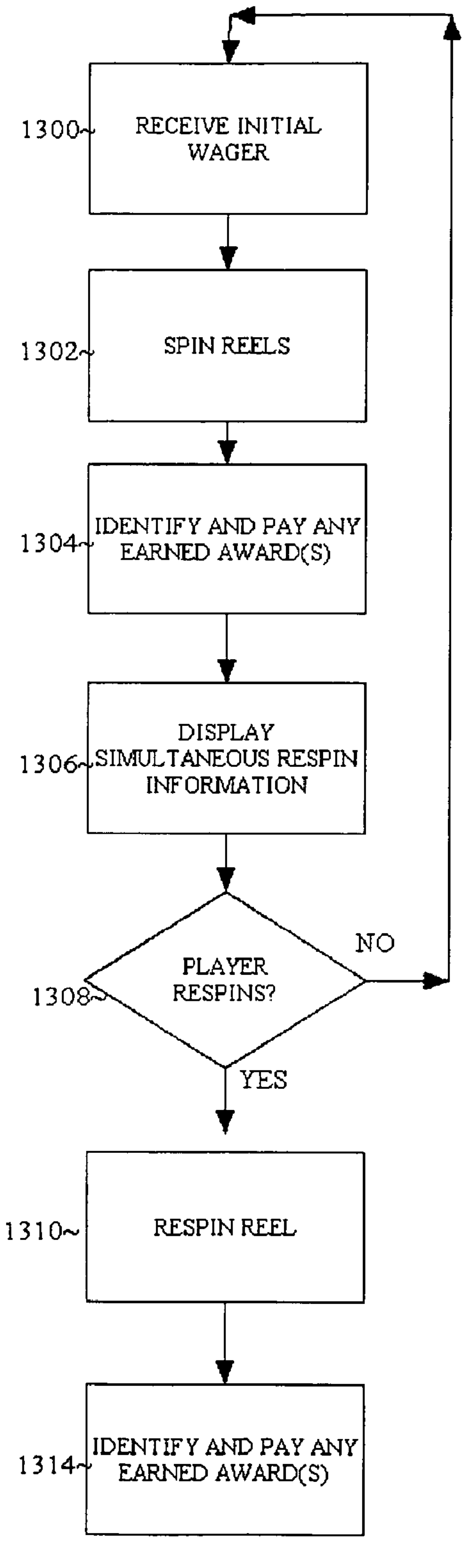
FIG. 13 is a flowchart illustrating an exemplary method of displaying simultaneous respin information, according to an embodiment.

FIG. 13 is a flowchart illustrating an exemplary method of displaying simultaneous respin information, according to an embodiment. FIG. 13 operates similarly to FIG. 9 and the respective description therein.

The method can begin with operation 1300, which receives the initial wager. See operation 900.

The method can proceed to operation 1302, which spins the reels to an initial outcome. See operation 902.

From operation 1302, the method can proceed to operation 1304, which identifies and pays any earned awards on the initial outcome. See operation 904.

Form operation 1304, the method can proceed to operation 1306, which displays simultaneous respin information. See FIG. 12 for one example of how simultaneous respin information can be displayed. The determination as illustrated in FIG. 14 can be performed for each individual reel and displayed accordingly.

From operation 1306, the method can proceed to operation 1308, which determines whether the player respins. See operation 912.

If the player decides to respin, the operations 1310 and 1314 can be performed (see operations 914 and 916).

Figure 14:
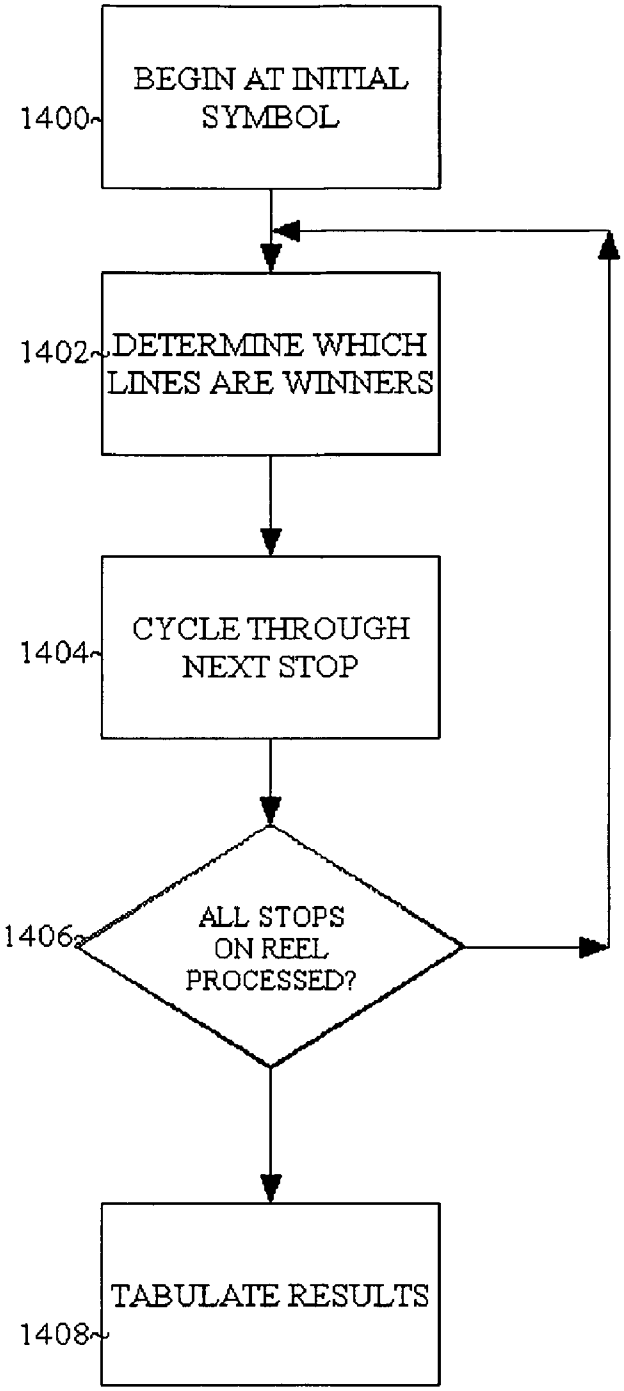
FIG. 14 is a flowchart illustrating an exemplary method of determining potentially winning lines for a reel respin, according to an embodiment.

FIG. 14 is a flowchart illustrating an exemplary method of determining potentially winning lines for a reel respin, according to an embodiment.

The method can begin with operation 1400, which begins with a current position of the selected reel (the reel to be respun) being an initial symbol. The initial symbol can be the current symbol (or reel position) the reel to be respun is currently in, or it could be any position at all. What is important is that all reel stops on the reel to be spun (the selected reel) are accounted for in the method.

From operation 1400, the method can proceed to operation 1402, which determines which lines are winners with the selected reel in a current position. This can be done by applying a paytable (which shows all the winning combinations) to all of the available paylines. Thus, for example, all of the winning combinations in Table I are applied to all of the paylines in FIG. 10A (or all of the active paylines) to determine if all of the reels (the remaining reels not being respun and the selected reel in the current position) form any winning combinations. Any winning combinations and their respective paylines, can be stored.

From operation 1402, the method can proceed to operation 1404, which advanced the selected reel to a next stop on the selected reel. Note that this advancing (cycling) is done computationally but is not actually displayed to the player.

From operation 1404, the method can proceed to operation 1406, which determines whether all stops on the selected reel have been processed. For example, if there are 10 stops on the selected reel, ten cycles of operations 1402 to 1404 should be performed so that each stop on the selected reel has had a chance to be computed. In other words, the selected reel is analyzed once for each possible position it can be in. If all of the stops on the selected reel are not processed, then the method can return to operation 1402.

If all of the stops on the selected reel have been processed, then the method can proceed to operation 1408, which tabulates the results. All of the winning paylines can be aggregated, as well as all potential awards. A maximum possible award can also be determined. Some or all of this information can then be displayed to the player.

Figure 15:
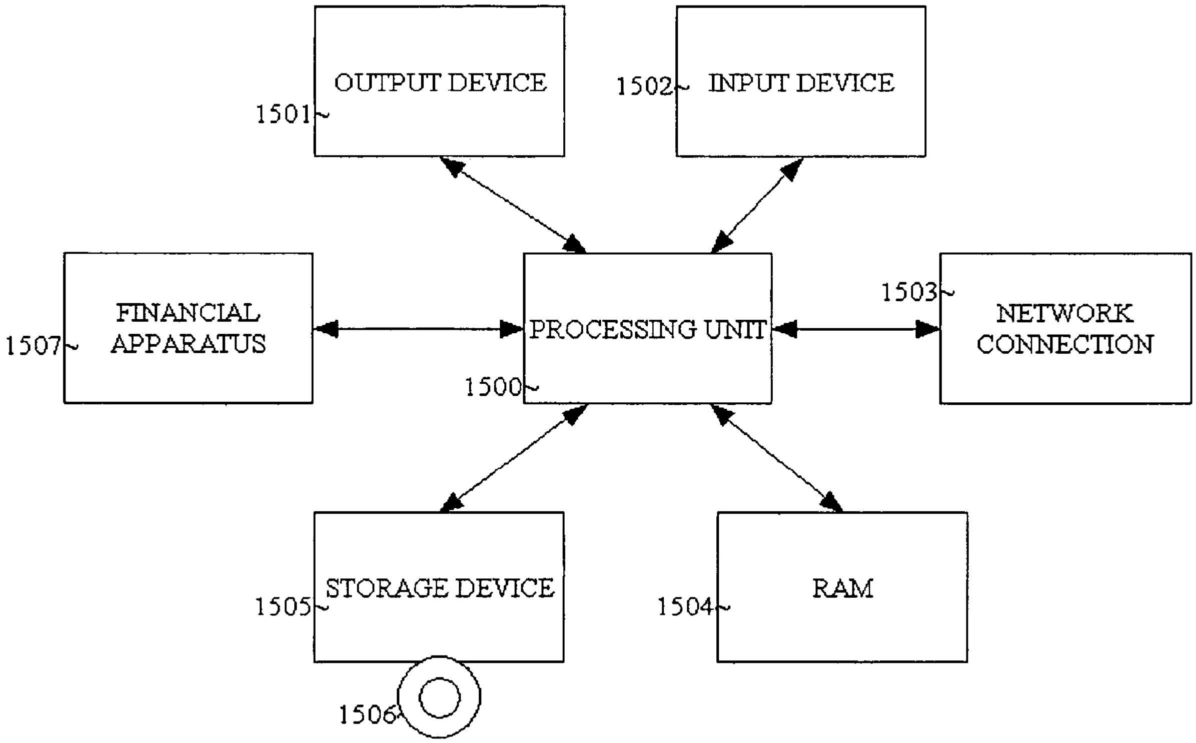
FIG. 15 is a block diagram illustrating one example of hardware that can be used to implement methods described herein, according to an embodiment.

FIG. 15 is a block diagram illustrating one example of hardware that can be used to implement methods described herein, according to an embodiment.

A processing unit 1500 can be a microprocessor and any associated apparatus (e.g., cache, etc.) The processing unit 1500 is connected to an output device 1501, which can be any output device, such as a touch screen monitor, LCD, CRT, etc. The output device 1501 can display results of the processing unit 1500, such as the reels spinning and their initial outcome and final outcome, awards won, any outputs described herein or known in the art, etc. The processing unit 1500 is also connected to an input device 1502, which can be any input device such as a touch screen monitor, keyboard, mouse, buttons, etc. The processing unit 1500 can also be connected to a network connection 1503 which can connect to the Internet, an LAN, WAN, or any computer communications network. The processing unit 1500 can also be connected to a RAM 1504 and a storage device 1505 (e.g., hard drive, DVD-drive, CD-ROM, flash memory, etc.) which can also read a computer readable storage medium 1506 such as a CD or DVD. The processing unit 1500 can also be connected to a financial apparatus 1507 which can be used to accept payments from the player (e.g., a bill collector which receives cash from the player and converts it into player credits), a coin dispenser (which pays winnings to the players in the form of coins), etc.

Any type of slot machine game can be used with the methods described herein, including video slot machines or mechanical, finite or random, etc. Players can wager for real cash and get paid in real cash or tokens which can be exchanged for cash in a casino. All of the methods described herein can be effectuated in any order, and any operation not necessary for the operation of the method may be optional.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a slot machine game, the method comprising:

receiving, via a slot machine, an initial wager from a player;

spinning, via the slot machine, a plurality of reels of the slot machine;

stopping, via the slot machine, each spinning reel of the plurality of spinning reels to an initial outcome for that reel, and then paying, via the slot machine, an award based on all of the initial outcomes;

cycling, via the slot machine, through all reel stops on a particular reel of the plurality of reels while the remaining reels of the plurality of reels remained stopped;

while cycling through all reel stops on the particular reel, the slot machine, at each reel stop, determining whether each payline at that reel stop is an active payline or a non-active payline, comparing a paytable to each active payline to determine if the active payline is a potential winning payline, and then computing a win value based on each active payline that is a potential winning payline at that reel stop, wherein each active payline at each reel stop includes a symbol of the particular reel, and wherein each active payline and non-active payline at each reel stop includes the initial outcomes of the remaining reels of the plurality of reels;

summing, via the slot machine, the computed win values to determine an accumulated value;

determining, via the slot machine, a respin cost for the particular reel by dividing the accumulated value by a number of reel stops on the particular reel;

displaying, via a display device at the slot machine, respin information that identifies the potential winning paylines that may result if the particular reel is respun and each reel of the remaining reels is not respun and remains at its initial outcome, wherein each potential winning payline comprises a winning combination of symbols defined by the paytable;

respinning, via the slot machine, the particular reel to a final outcome; and paying, via the slot machine, any awards earned resulting from the initial outcome of each reel of the remaining reels of the plurality of reels and the final outcome.

2. The method as recited in claim 1, wherein the display device is arranged to display respin information for each reel of the remaining reels of the plurality of reels.

3. The method as recited in claim 1, wherein the respin information comprises a maximum win that can be earned when the particular reel is respun.

4. The method as recited in claim 1, wherein the respinning is performed without extra payment from the player.

5. The method as recited in claim 1, wherein the respinning is performed upon payment of the respin cost from the player.

6. An apparatus to play a slot machine game, the apparatus comprising:

a processing unit configured to:

(i) receive an initial wager from a player;

(ii) spin a plurality of reels of a slot machine game and stop each reel of the plurality of reels to an initial outcome for that reel;

(iii) cycle through all reel stops on a particular reel of the plurality of reels while the remaining reels of the plurality of reels remained stopped;

(iv) while cycling through all reel stops on the particular reel, compare, at each reel stop, a paytable to paylines at that reel stop so as to determine which paylines at that reel stop are potential winning paylines and to compute a win value based on the potential winning paylines at that reel stop, wherein the paylines at each reel stop of the particular reel include the initial outcome of each reel of the remaining reels of the plurality of reels;

(v) sum the computed win values to determine an accumulated value;

(vi) determine a respin cost for the particular reel by dividing the accumulated value by a number of reel stops on the particular reel;

(vii) respin the particular reel to a final outcome; and (viii) pay any awards earned resulting from the initial outcome of each reel of the remaining reels of the plurality of reels and the final outcome; and an output device to display the initial outcome, respin information, and the final outcome, wherein the respin information comprises the respin cost for the particular reel and information that identifies potential winning paylines that may result if the particular reel is respun and each of the remaining reels remains at the initial outcome for that reel, and wherein each identified potential winning payline comprises a winning combination of symbols defined by the paytable.

7. The apparatus as recited in claim 6, wherein the output device displays respin information for each reel of the plurality of reels.

8. The apparatus as recited in claim 7, wherein the respin information comprises a maximum win that can be earned when the particular reel is respun.

9. The apparatus as recited in claim 6, wherein the respin is performed without extra payment from the player.

10. The apparatus as recited in claim 6, wherein the respin is performed upon payment of the determined respin cost from the player.

11. A method to play a slot machine game, the method comprising:

receiving, via a slot machine, an initial wager from a player;

spinning, via the slot machine, a plurality of reels of the slot machine and stopping, via the slot machine, each reel of the plurality of reels to an initial outcome for that reel;

cycling, via the slot machine, through all reel stops on a particular reel of the plurality of reels while the remaining reels of the plurality of reels remained stopped;

while cycling through all reel stops on the particular reel, the slot machine comparing, at each reel stop, a paytable to paylines at that reel stop so as to determine which paylines at that reel stop are potential winning paylines and then computing a win value based on the potential winning paylines at that reel stop, wherein the paylines at each reel stop of the particular reel include the initial outcomes of the remaining reels of the plurality of reels;

summing, via the slot machine, the computed win values to determine an accumulated value;

determining, via the slot machine, a respin cost for the particular reel by dividing the accumulated value by a number of reel stops on the particular reel;

displaying, via a display device at the slot machine, respin information that identifies (i) the potential winning paylines that may result if the particular reel is respun and each reel of the remaining reels is not respun and is positioned at its initial outcome, and (ii) the respin cost for the particular reel;

receiving, via the slot machine, payment of the respin cost;

respinning, via the slot machine, the particular reel to a final outcome; and paying, via the slot machine, any awards earned resulting from the initial outcome of each reel of the remaining reels of the plurality of reels and the final outcome.

12. The method as recited in claim 11, wherein the particular reel is cycled through all the reel stops on the particular reel computationally.

13. The method as recited in claim 11, further comprising:

displaying respin information for each reel of the remaining reels of the plurality of reels.

14. The method as recited in claim 13, wherein the respin information comprises a maximum win that can be earned when the particular reel is respun.

15. The method of claim 11, wherein the respin cost includes an amount added to provide a house advantage.

16. The method of claim 15, wherein the house advantage is greater than or less than a house advantage factored in for the initial wager received from the player.

17. The method of claim 11, further comprising:

paying an award based on the initial outcomes of the plurality of reels.

18. The method of claim 11, wherein each payline determined to be a potential winning payline includes a symbol from the particular reel of the plurality of reels.

* * * * *